United States Patent [19]
Matsuoka

[11] Patent Number: 5,683,605
[45] Date of Patent: Nov. 4, 1997

[54] HEATER CONTROLLING UNIT USING A FUZZY NEURAL NETWORK

[75] Inventor: Teruhiko Matsuoka, Chiba, Japan

[73] Assignee: Sharp Kabushiki Kaisha, Japan

[21] Appl. No.: 572,079

[22] Filed: Dec. 14, 1995

[30] Foreign Application Priority Data

Dec. 27, 1994 [JP] Japan .................. 6-326353

[51] Int. Cl.$^6$ .................................. H05B 1/02
[52] U.S. Cl. .................. 219/497; 219/505; 219/506; 374/107; 395/900
[58] Field of Search ............ 219/411–413, 486, 219/492, 497, 501, 506, 505, 508; 340/588, 589; 374/102, 107; 395/3, 900

[56] References Cited

U.S. PATENT DOCUMENTS

| | | | |
|---|---|---|---|
| 4,570,054 | 2/1986 | Chidzey et al. | 219/497 |
| 4,868,368 | 9/1989 | Araki | 219/216 |
| 4,948,950 | 8/1990 | Rae | 219/497 |
| 5,311,268 | 5/1994 | Ohzeki et al. | 355/285 |
| 5,386,099 | 1/1995 | Has | 219/413 |

FOREIGN PATENT DOCUMENTS

| | | |
|---|---|---|
| 310275 | 3/1991 | Japan . |
| 473786 | 3/1992 | Japan . |
| 4178678 | 6/1992 | Japan . |
| 4303875 | 10/1992 | Japan . |
| 5323830 | 12/1993 | Japan . |

*Primary Examiner*—Mark H. Paschall
*Attorney, Agent, or Firm*—David G. Conlin; John L. Welch

[57] ABSTRACT

A heater controlling unit used in a heat fusing device of an image forming apparatus, such as a copying machine, comprises a temperature detecting unit for outputting a detected temperature, a temperature change rate computing unit for computing the surface temperature of a heat fusing roller using the output of the temperature detecting unit, and an on-time computing and controlling unit for computing a heater on-time within a predetermined period by means of a fuzzy neural network using the above temperature and a temperature change rate found by the temperature-change rate computing unit, a heater controlling circuit for controlling the on/off action of the heater, a predictive computing unit for predicting the surface temperature, and a comparing and adjusting unit for comparing the actual temperature with the predicted temperature, and, when the difference is greater than a predetermined value (e.g., ±5° C.), for adjusting the weights of the links within the network. Accordingly, the roughly-set parameters can be amended to the ones for an optimal on-time by the sequential learning. As a result, the program can be generated in a simpler manner, and the program can be changed easily for individual units depending on aged distortion and environments thereof.

10 Claims, 7 Drawing Sheets

HEATER CONTROLLING UNIT USING A FUZZY NEURAL NETWORK

FIELD OF THE INVENTION

The present invention relates to a heater controlling unit for controlling a heater employed in a heat fusing device or the like in an electrophotographic image forming apparatus, such as a laser printer for forming an electrostatic latent image using a laser beam, a digital copying machine capable of processing an input original image, an analogue copying machine, and a plain-paper facsimile.

BACKGROUND OF THE INVENTION

The above-mentioned electrophotographic image forming apparatus employs a heat fusing device 10 as shown in FIG. 9 to heat-fuse a toner image transferred onto a recording paper. The heat fusing device 10 includes a heat fusing roller 4 and a heater 5, such as a halogen lamp, provided inside of the heat fusing roller 4. The surface of the heat fusing roller 4 is heated by the heater 5 and pressed against a toner image to heat-fuse the same onto a recording paper. In the heat fusing device 10, a heater controlling circuit 7 supplies power from an alternative power source 2 to the heater 5 through a thermal fuse 6, so that the surface temperature of the fusing roller 4 can be stabilized at a desired level.

A temperature detecting unit 1, which is in effect a thermistor or the like, is provided in the vicinity of the heat fusing roller 4 to detect the surface temperature thereof and a controller 3 drives the heater controlling circuit 7 depending on whether or not the detected temperature exceeds a predetermined temperature, whereby the heater controlling circuit 7 controls the on/off action of the heater 5 and the surface temperature of the heat fusing roller 4 is stabilized at the predetermined level.

In other words, in case of the conventional heater controlling device, the controller 3 controls the on/off action of the heater 5 based on a comparison result of the surface temperature of the heat fusing roller 4 detected by the temperature detecting unit 1 with the predetermined temperature. However, it takes some time for the heat fusing roller 4 to conduct the heat generated by the heater 5 provided inside thereof to its surface, which is known as a heat response time. Thus, the surface temperature of the heat fusing roller 4 exceeds the predetermined temperature when the heater 5 is kept turned on, thereby causing a so-called overshoot.

To eliminate this problem, Japanese Publication for Unexamined Patent Application No. 10275/1991 discloses a heater controlling unit which controls the activation and deactivation of a heat fusing roller and a rotation rate thereof in accordance with fuzzy rules using input values, such as the surface temperature of the heat fusing roller, ambient temperature, and accumulative time since the main switch is turned on.

Also, Japanese Publication for Unexamined Patent Applications No. 73786/1992 and No. 303875/1992 disclose another type of heater controlling unit which drives the heater in accordance with fuzzy rules using the temperature of the heat fusing roller and the rate of the temperature change. Further, Japanese Publication for Unexamined Patent Application No. 178678/1992 discloses still another type of heater controlling unit which performs a fuzzy control of a period of time during which the heater is turned on (heater on-time) using the temperature of a heat fusing roller and differential values thereof. In addition, Japanese Publication for Unexamined Patent Application No. 323830/1993 proposes still another type of heater controlling unit which performs a fuzzy control of the heater on-time based on a deviation of room temperature, the output values of a thermistor and the gradient thereof.

Each of the above conventional heater controlling units, however, demands a correct fuzzy rule in advance. In other words, if the fuzzy rule is incorrect, the heater is not controlled in a proper manner. Also, a membership function representing a fuzzy variable is irrevocable once a specific value is given. Therefore, the values must be found in advance by trial and error, which makes the fuzzy rule generating process troublesome.

Moreover, since the fuzzy rules and membership function are irrevocable, they can not be amended for the heat fusing devices individually depending on the models, aged distortion, and environments thereof.

SUMMARY OF THE INVENTION

It is therefore an object of the present invention to provide a heater controlling unit which controls the on/off action of a heater to control the surface temperature of a heat releasing unit that releases heat generated by the heater through conduction, more precisely, the heater controlling unit which can prevent an overshoot by sequentially learning aged distortion and environments to find an optimal heater on-time.

To fulfill the above object, the heater controlling unit of the present invention is characterized by having:

a temperature detecting unit for detecting an actual temperature of a surface of the heat releasing unit;

a temperature change rate computing unit for computing a temperature change rate within a predetermined period using the actual temperature detected by the temperature detecting unit;

an on-time computing and control unit for controlling the heater by computing a period of time during which the heater is turned on, the period of time being computed by means of a fuzzy neural network using the actual temperature detected by the temperature detecting unit and the temperature change rate computed by the temperature change rate computing unit;

a predictive computing unit for, when the heater is turned on by the on-time computing and control unit, computing a predictive temperature of the surface of the heat releasing unit for a next time the heater is turned on, the predictive temperature being computed using the actual temperature detected by the temperature detecting unit and the temperature change rate computed by the temperature change rate computing unit; and a comparing and adjusting unit for computing a balance between the actual temperature detected by the temperature detecting unit and the predictive temperature computed by the predictive computing unit, and, when the balance is greater than a predetermined value, for adjusting a weight of a link within the fuzzy neural network of the on-time computing and controlling unit to minimize the balance.

According to the above structure, the temperature detecting unit detects an actual temperature of the surface of the releasing unit while the temperature change rate computing unit computes the temperature change rate in a predetermined period using the actual temperature, and the on-time computing and controlling unit computes a period during which the heater is turned on (heater on-time) by means of the fuzzy neural network using the actual temperature and temperature change rate as input parameters, whereby the heater controlling unit controls the heater by controlling the surface temperature of the heat releasing unit, such as a heat fusing roller, used in a heat fusing device of an image forming apparatus.

In addition, when the heater is turned on, the predictive temperature computing unit computes a predictive temperature of the surface of the heater for a next time the heater is turned on. Then, the comparing and adjusting unit computes a balance between the predictive temperature and actual temperature detected by the temperature detecting unit, and compares the balance with a predetermined value. If the balance is greater than the predetermined value, for example, ±5° C., the comparing and adjusting unit adjusts a weight of a link within the fuzzy neural network to minimize the balance.

Thus, parameters, such as weights of links within the fuzzy neural network, can be set roughly, because these values can be amended later by the sequential learning to such values that can find an optimal heater on-time to prevent an overshoot of the heat releasing unit. As a result, not only the fuzzy rules can be generated in a simple manner, but also each rule can be readily adjusted to individual heaters depending on the models, aged distortion, and environments thereof.

Also, only the actual temperature of the heat releasing unit and the temperature change rate thereof in a predetermined period are inputted into the fuzzy neural network. This means only a single parameter, namely, the actual temperature, need be detected, thereby simplifying the structure of the heater controlling unit. Moreover, using only two input values enables the heater controlling unit to reduce the amount and time of computation. Accordingly, the on-time can be changed promptly in response to the temperature change, and thus, the temperature can be controlled quickly.

To be more specific, the comparing and adjusting unit adjusts the weights of the links within the fuzzy neural network in such a manner that a balance between the heater on-time computed by the on-time computing and controlling unit and a predetermined target value will be minimized. Accordingly, the balance between the actual temperature and predictive temperature can be minimized effectively.

The fuzzy neural network may comprise an input layer, a membership input layer, a membership output layer, a rule layer, and an output layer, and each link among these layers may have a weight. Further, each of the input layer and membership input layer may have a structure such that divides each of the actual temperature and temperature change rate into three areas, and the rule layer may output ANDs of all the possible links of output values respectively from nodes corresponding to the three areas of the actual temperature in the membership output layer and output values of nodes corresponding to the three areas of the temperature change rate to the output layer.

According to the above structure, each of the input layer and membership input layer receives each of the actual temperature and temperature change rate and divides each into three areas of a fuzzy set: Big, Middle, and Small. Thus, the membership output layer comprises nodes corresponding to each area of the actual temperature, and nodes corresponding to each area of the temperature change rate. The rule layer outputs ANDs of all the possible links of output values of the nodes corresponding to each area of the actual temperature of the membership output layer and the output values of the nodes corresponding to each area of the temperature change rate.

Thus, the input value in each area can be controlled individually, which can realize a control in response to a complicated change. Also, since all the possible links of rules with each input value in each area are prepared in advance, if there occurs a link that does not fit the fuzzy rule obtained from the knowledge of experts, a matching link can be found without fail, allowing the sequential learning. As a result, if parameters are set roughly, the temperature can be controlled in an optimal manner by adjusting the weight of each rule.

For a fuller understanding of the nature and advantages of the invention, reference should be made to the ensuing detailed description taken in conjunction with the accompanying drawings.

DESCRIPTION OF THE EMBODIMENT

Referring to FIGS. 1 through 8, the following description describes an example embodiment of the present invention, in which a heater controlling unit of the present invention is employed in an image forming apparatus, such as a copying machine.

Figure 1:
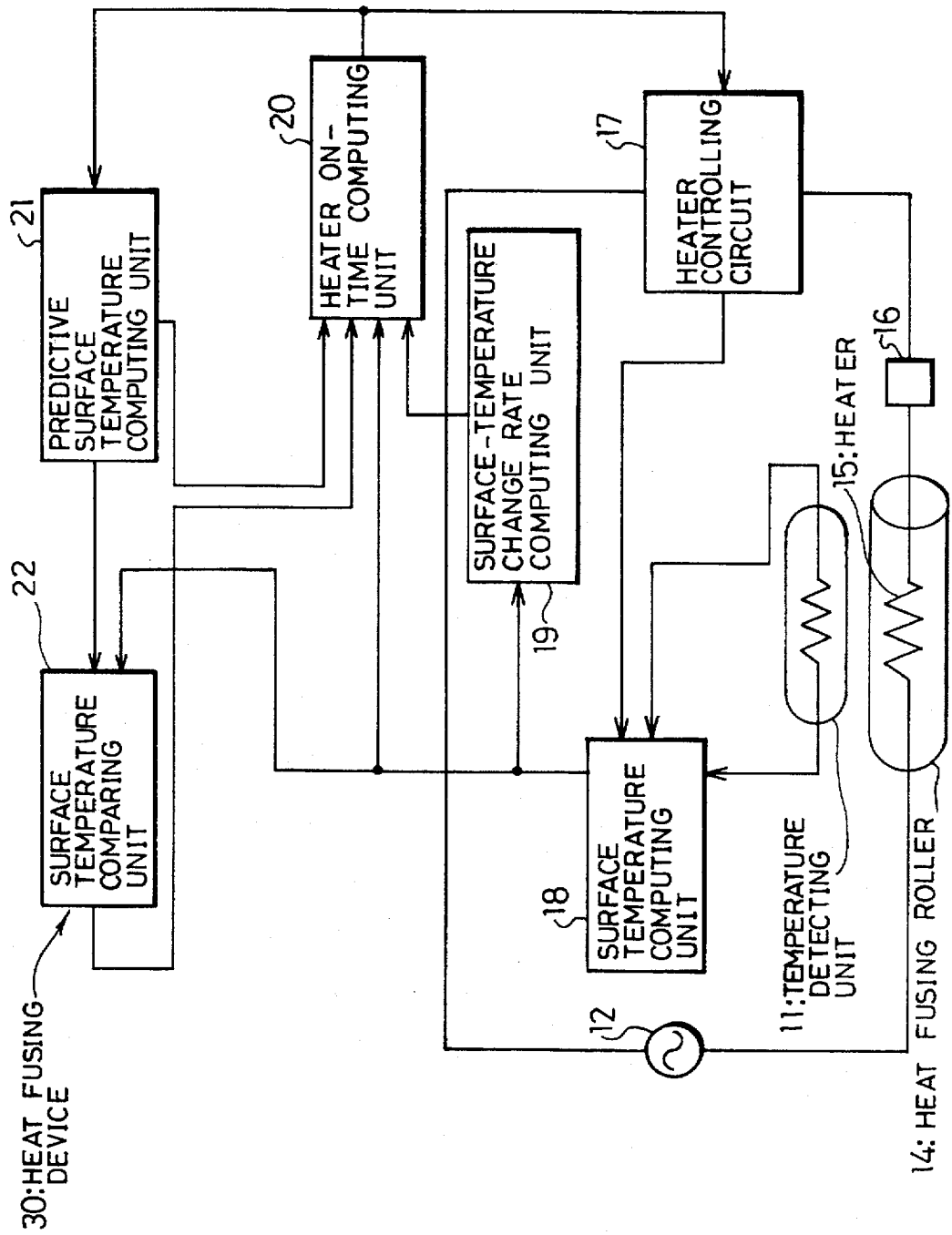
FIG. 1 is a block diagram depicting an electrical structure of a heat fusing device in accordance with an example embodiment of the present invention.

FIG. 1 is a block diagram depicting an electrical structure of a heat fusing device 30 in accordance with an example embodiment of the present invention. Power from an alternative power source 12 is supplied to a heater 15 through a heater controlling circuit (on-time computing and control means) 17 and a thermal fuse 16. The heater control circuit 17 is, in effect, a relay, IC switch, or the like, and starts or stops the power supply to the heater 15 in response to a driving signal including an on/off command from a heater on-time computing unit (on-time computing and controlling means) 20, which will be described below. The heater controlling circuit 17 outputs a state display signal, which shows an on/off state in response to the driving signal, to a surface temperature computing unit (temperature detecting means) 18, which also will be described below.

The heater 15, such as a halogen lamp, is provided inside of a heat fusing roller (heat releasing means) 14. Therefore, the heat fusing roller 14 conducts the heat generated by the heater 15 to its surface after a thermal response time. In other words, the surface temperature of the heat fusing roller 14 starts or stops to rise a few seconds after the heater 15 is turned on or off because of the thermal response time.

The heat fusing device 30 includes a temperature detecting unit 11, which is in effect a thermistor or the like, in the vicinity of the heat fusing roller 14. The terminal resistance value of the temperature detecting unit 11 varies in response to a change in the surface temperature of the heat fusing roller 14. The temperature detecting unit 11 is connected to the surface temperature computing unit 18, whereby the surface temperature computing unit 18 computes the surface temperature of the heat fusing roller 14 using the terminal resistance value.

Figure 2:
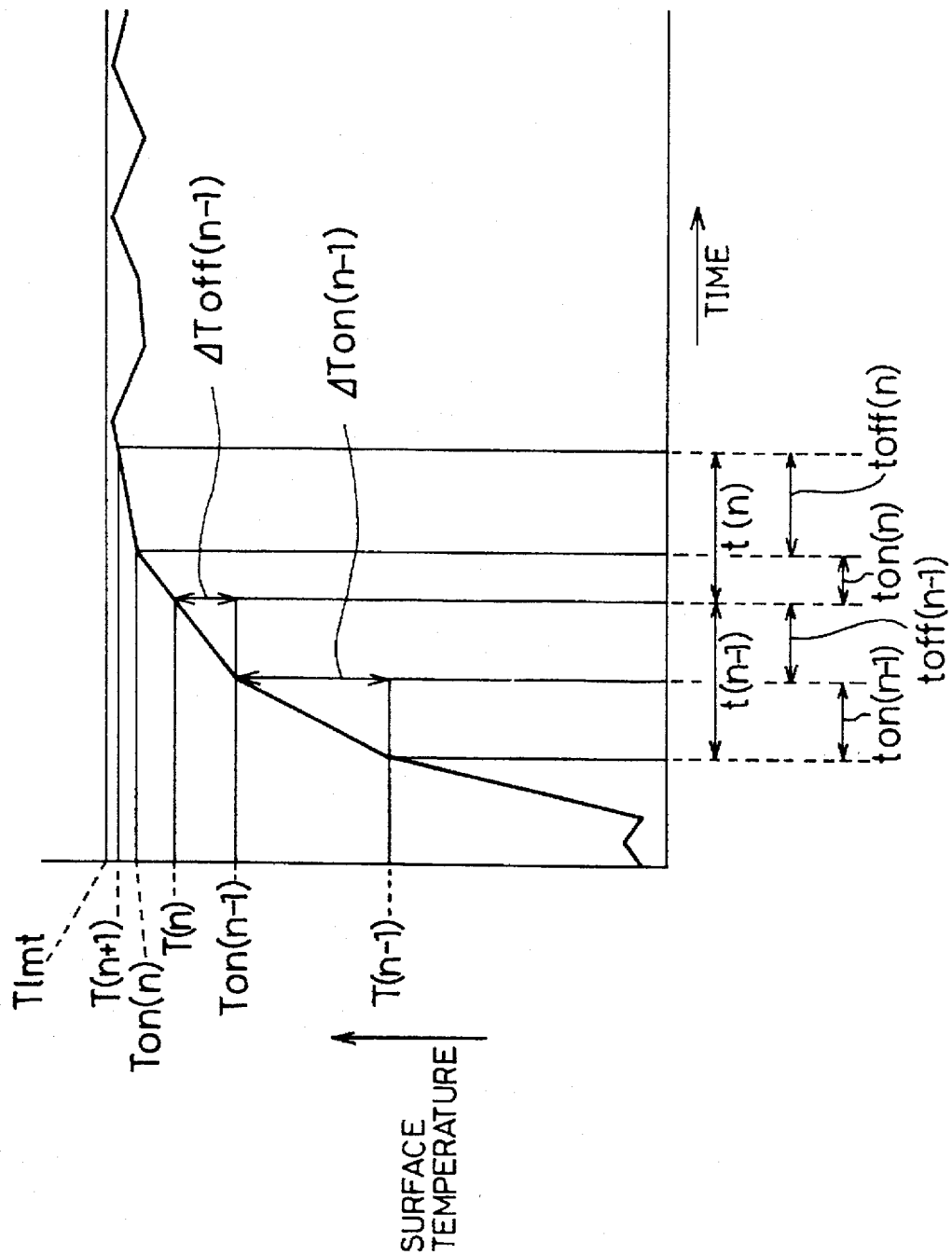
FIG. 2 is a graph showing an example of a sampling timing of the surface temperature of a heat fusing roller and a sampled temperature.

As shown in FIG. 2, the surface temperature computing unit 18 converts a terminal voltage value which corresponds to the terminal resistance value of the temperature detecting unit 11 into a digital form from an analogue form and samples the result of the conversion in a cycle ranging from three to five seconds. In the drawing, periods between the samplings are indicated as t(h) (h=1, 2, . . . , n−1, n, n+1, n+2, . . . ). The heater 15 is turned on in sync with the start of each period t(h), which will be described below. The surface temperature computing unit 18 performs a sampling based on the state display signal inputted from the heater control circuit 17 when the heater 15 is turned off during each period t(h). Then, the surface temperature computing unit 18 computes a surface temperature value corresponding to the sampled voltage value with reference to a voltage-temperature conversion table which is prepared in advance.

In FIG. 2, $t_{on}(h)$ represents a period of time (on-time) during which the heater 15 is turned on within the h'th period t(h), while $t_{off}(h)$ represents a period of time (off-time) during which the heater 15 is turned off within the h'th period t(h). Also, T(h) represents the surface temperature of the heat fusing roller 14 at the start of the period t(h), while $T_{on}(h)$ represents the surface temperature of the heat fusing roller 14 at the end of the on-time within the period t(h). Further, $T_{lmt}$ represents the upper limit of the temperature of the heat fusing roller 14, namely, a predetermined temperature. The surface temperature of the heat fusing roller 14 thus found is sent to a surface-temperature change rate computing unit (change rate computing means) 19, a heater on-time computing unit (comparing and adjusting means) 20, and a surface temperature comparing unit 22, respectively.

The surface-temperature change rate computing unit 19 computes a temperature change rate $\Delta T_{on}(n-1)$ of the heater 15 during the on-time $t_{on}(n-1)$ within the preceding period t(n−1) using the preceding surface temperature T(n−1) inputted and stored in a memory or the like, and the latest input surface temperature $T_{on}(n-1)$. Also, the surface-temperature change rate computing unit 19 computes a temperature change rate $\Delta T_{off}(n-1)$ of the heater 15 during the off-time toll(n−1) using the input surface temperature $T_{on}(n-1)$ and the following input surface temperature T(n). The temperature change rates $\Delta T_{on}(n-1)$ and $\Delta T_{off}(n-1)$ can be found using Equations (1) and (2) below, respectively. Here, $t_{off}(n-1)$ is defined as: $t_{off}(n-1)=t(n-1)-t_{on}(n-1)$.

$$\Delta T_{on}(n-1) = \frac{T_{on}(n-1) - T(n-1)}{t_{on}(n-1)} \qquad (1)$$

$$\Delta T_{off}(n-1) = \frac{T(n) - T_{on}(n-1)}{t_{off}(n-1)} \qquad (2)$$

The surface temperature T(n), temperature change rates $\Delta T_{on}(n-1)$ and $\Delta T_{off}(n-1)$ thus found are used as input parameters by the heater on-time computing unit 20, which computes an on-time of the heater 15 using a fuzzy neural network, which will be described below. The heater on-the computing unit 20 turns on the heater 15 for the on-time $t_{on}(n)$ thus found from the start of the current period t(n) by outputting the driving signal to the heater controlling circuit 17.

The on-time $t_{on}(n)$ is sent to the predictive surface temperature computing unit (predictive computing means) 21, which predicates a following surface temperature T'(n+1) based on Equation (3) below using the on-time $t_{on}(n)$ and off-time $t_{off}(n)$ as well as the temperature change rates $\Delta T_{on}(n-1)$ and $\Delta T_{off}(n-1)$ and the surface temperature T(n), and sends the predictive surface temperature T'(n+1) to the surface temperature comparing unit 22.

$$T'(n+1)=t_{on}(n)\times\Delta T_{on}(n-1)+t_{off}(n)\times\Delta T_{off}(n-1)+T(n) \qquad (3)$$

The surface temperature comparing unit 22 compares the predictive surface temperature T'(n+1) for the (n+1)'th period t(n+1) inputted from the predictive surface temperature computing unit 21 with the actual value T(n+1) computed by the surface temperature computing unit 18. When there is a balance (T'(n+1)−T(n+1)) exceeding ±5° C., the surface temperature comparing unit 22 outputs a control signal to fine-adjust the fuzzy neural network in the heater on-time computing unit 20. The heater on-time computing unit 20, in response to the control signal, fine-adjusts the conditions in a manner described below first, and thence computes the on-time $t_{on}(n+1)$ within the (n+1)'th period t(n+1) using the actual surface temperature T(n+1) and temperature change rates $\Delta T_{on}(n)$ and $\Delta T_{off}(n)$, all of which are found within the (n+1)'th period t(n+1).

Figure 3:
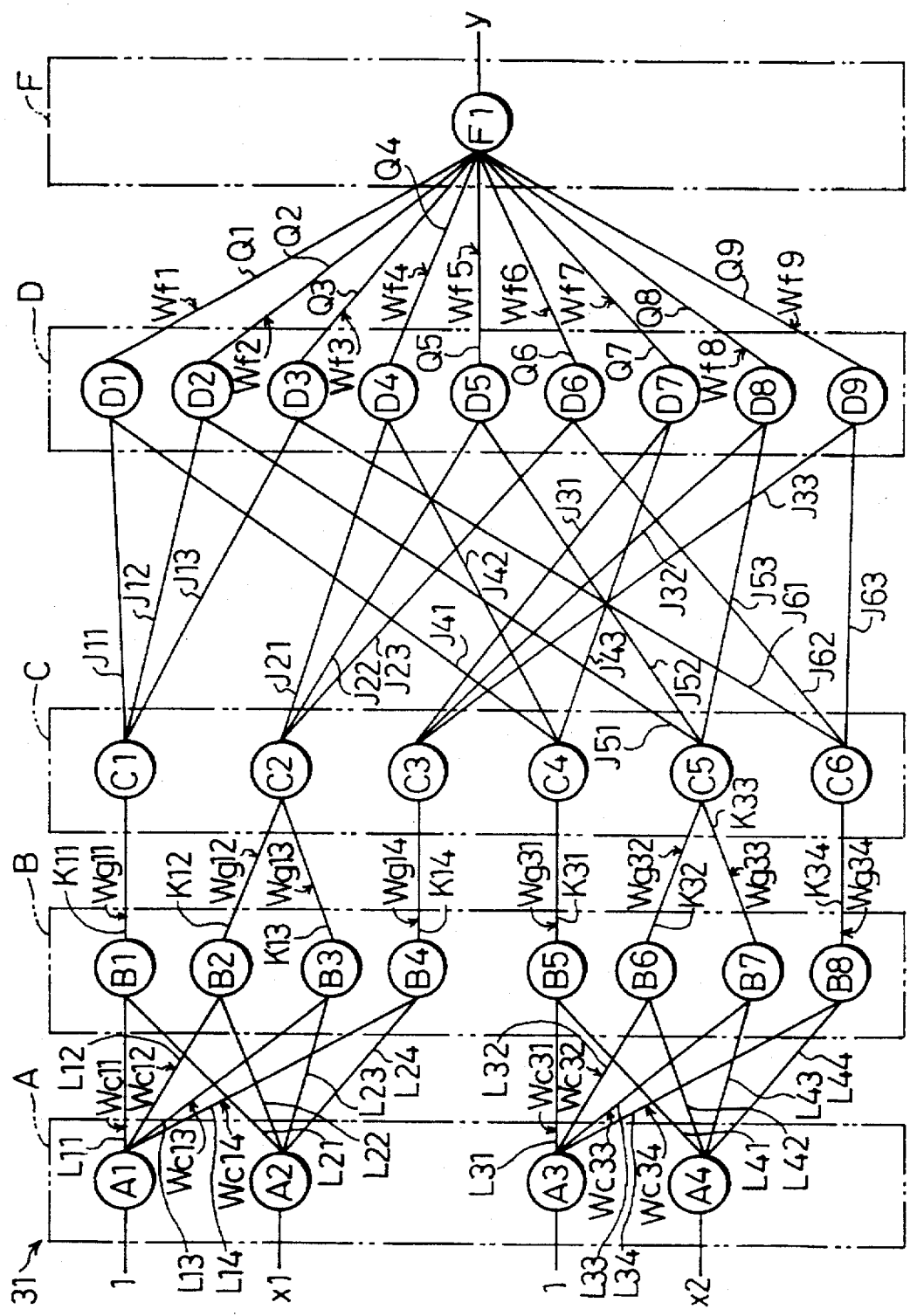
FIG. 3 is a block diagram depicting a structure of a fuzzy neural network in accordance with the present invention, which is provided in a heater on-time computing unit of the heat fusing device.

FIG. 3 is a block diagram depicting the structure of a fuzzy neural network 31 in accordance with the present invention assembled in the heater on-time computing unit 20. The fuzzy neural network 31 is assembled in substantially the same manner as the disclosure of Japanese Patent Application No. 175805/1994 by the Applicant of the present invention, and the explanation is omitted herein.

In the present embodiment, an input to the fuzzy neural network 31 has two values respectively representing the surface temperature T indicated as $x_1$ and the change rate $\Delta T$ of the surface temperature T indicated as $x_2$, while an output from the fuzzy neural network 31 to the heater control circuit 17 has one value indicated as y. The fuzzy neural network 31 comprises an input layer A, a membership input layer B, a membership output layer C, a rule layer D, and an output layer F.

The input layer A includes: (1) a node A2 into which the input value $x_1$, namely, the surface temperature T, is inputted, (2) a node A1 into which a constant number, i.e., one, related to the surface temperature T is inputted, (3) a node A4 into which the input value $x_2$, namely, the temperature-change rate $\Delta T$, is inputted, and (4) a node A3 into which a constant number, i.e., one, related to the temperature-change rate $\Delta T$ is inputted.

Figure 4:
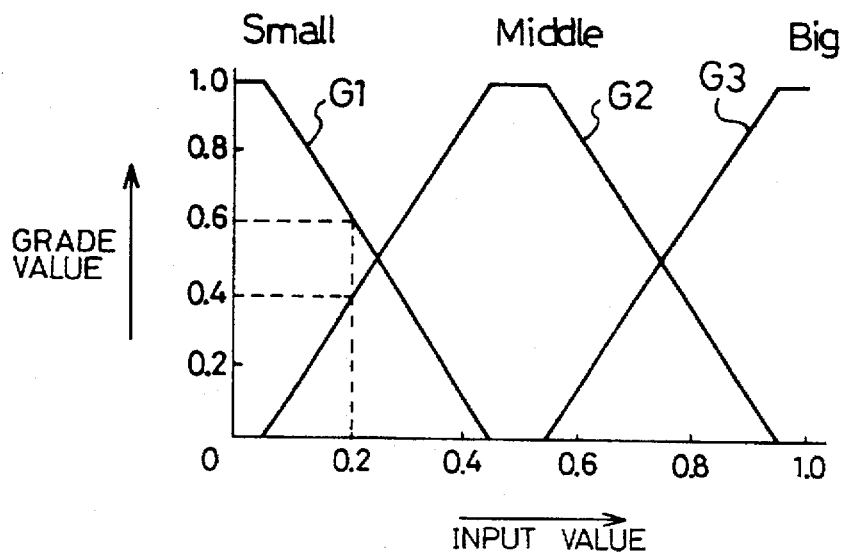
FIG. 4 is a graph of a membership function used in the present invention.

As shown in FIG. 4, the membership function is divided into three areas: an area Small denoted as G1, an area Middle denoted as G2, and an area Big denoted as G3. In the drawing, the horizontal axis represents an input value x while the vertical axis represents a grade value (output value) of the membership function. For instance, let x be 0.2, then the grade values indicating the probability of fuzzy propositions, "x is small", "x is middle", and "x is big" are respectively 0.6, 0.4, and 0.0 as shown in FIG. 4. The grade value of a fuzzy proposition is an arbitrary value in a range between 0 and 1 inclusive.

The membership input layer B of the present invention includes nodes B1–B4;B5–B8 respectively for the input values $x_1$ and $x_2$, and hence the nodes A1, A2;A3, A4 in the input layer A, respectively. Of all the areas of the membership function shown in FIG. 4, the Small area denoted as G1 and Big area denoted as G3 are respectively monotonous decreasing and monotonous increasing, and each uses a single node. Whereas the Middle area denoted as G2 is angular, and thus uses two nodes and is expressed by an AND of a sigmoid function of each node. In the present invention, therefore, four nodes are provided for three areas.

The nodes A1, A2 and B1–B4 are connected to each other by links Lij(i=1, 2, j=1, 2, 3, 4) and so are the nodes A3, A4 and B5–B8 by links Lij (i=3, 4, j=1, 2, 3, 4). Each of the links L11–L14 and L31–L34, which are respectively connected to the node A1 and node A3, have their respective weights $Wc_{ij}$(i=1, 3 and j=1–4) representing a center value of the membership function. Whereas a weight of one is given to the other links L21–L24 and L41–L44.

Figure 5:
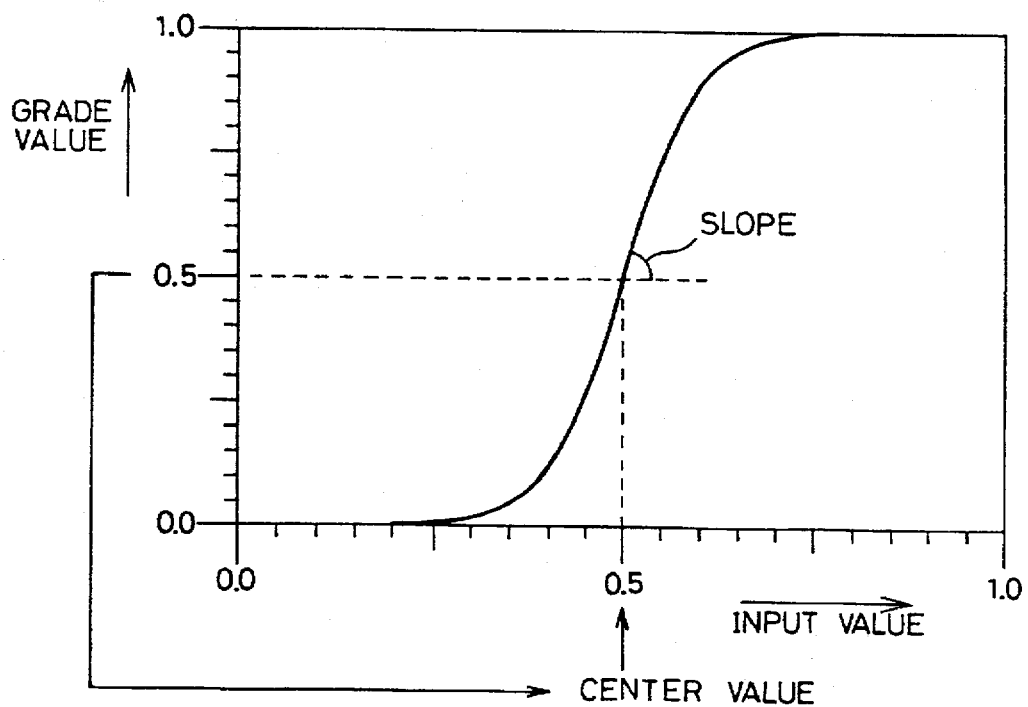
FIG. 5 is a graph explaining the relation between the membership function and weights $Wc_{ij}$ and $Wg_{ij}$.

The weight $Wc_{ij}$ (i=1,3, J=1–4) is an input value (center value) when the grade value of the membership function is 0.5. For example, when the membership function is a monotonous increasing function as shown in FIG. 5, the weight $Wc_{ij}$ is 0.5.

Thus, in the present invention, the weight $Wc_{11}(Wc_{31})$ is the center value of the membership function that indicates the input value $x_1(x_2)$ is Big, while the weight $Wc_{14}(Wc_{34})$ is the center value of the membership function that indicates the input value $x_1(x_2)$ is Small. The membership function that indicates the input value $x_1(x_2)$ is Middle is expressed by an AND of a monotonous increasing function and a monotonous decreasing function. Therefore, the weights $Wc_{12}(Wc_{32})$ and $Wc_{13}(Wc_{33})$ are the center values of the above two functions, respectively.

In an equation used in a neural network computation, the output of each node in each layer is expressed by an input multiplied by the weight of a link, and the input of each node in the next layer is the sum of the outputs from all the nodes connected to the node, and thus expressed as f{Σ(input to each layer)×weight of a link}. As previously explained, the weights of the links L21–24 and L41–L44 respectively provided for the input values $x_1$ and $x_2$ are set to one. The links L11–L14 and L31–L34 provided for the constant number one have the weights $Wc_{11}$–$Wc_{14}$ and $Wc_{31}$–$Wc_{34}$, respectively. Therefore, an input value $H_j$ from the input layer A to a node $B_j$ of the membership input layer B is found by:

$$x_1 \times 1 + 1 \times Wc_{ij}(j=1\text{–}4) \text{ or}$$

$$x_2 \times 1 + 1 \times Wc_{3j}(j=5\text{–}8).$$

Thus, as expressed by Equation (4) below, the input value $H_j$ is the adding result of the input value $x_1$ or $x_2$ and the weight $Wc_{ij}$.

$$H_j = x_1 + Wc_{1j}(j=1\text{–}4)$$

$$H_j = x_2 + Wc_{3j}(j=5\text{–}8) \tag{4}$$

Next, the membership output layer C includes six nodes corresponding to the three areas G1–G3 of the fuzzy propositions: nodes C1–C3; C4–C6 for the input values $x_1$ and $x_2$, respectively. The membership input layer B and membership output layer C are connected to each other by links Kij (i=1, 3, j=1–4).

The nodes B1–B8 are connected, in the following manner, to the nodes C1, C2, C3; C4, C5, C6 in the membership output layer C, which correspond to the three areas G1, G2, and G3 of the membership function. The nodes B1, B4; B5, B8 are respectively connected to the nodes C1, C3; C4, C6 by the links K11, K14; K31, K34 each having their respective weights $Wg_{11}$, $Wg_{14}$; $Wg_{31}$, $Wg_{34}$. The nodes B2 and B3 are respectively connected to the node C2 by the links K12 and K13 having their respective weights $Wg_{12}$ and $W_{13}$. Further, the nodes B5 and B6 are respectively connected to the node C5 by the links K32 and K33 having their respective weights $Wg_{32}$ and $Wg_{33}$.

An input value $H_j$ of the membership input layer B is multiplied by the weight $Wg_{ij}$ representing a slope of the membership function and outputted to the membership output layer C, and an output value of the sigmoid function $M_{ik}$ is found by using the resulting value as an input value to the sigmoid function, which is expressed by Equation (5) below.

$$M_{ik} = f(H_j \times Wg_{ij}) \tag{5}$$

Figure 6:
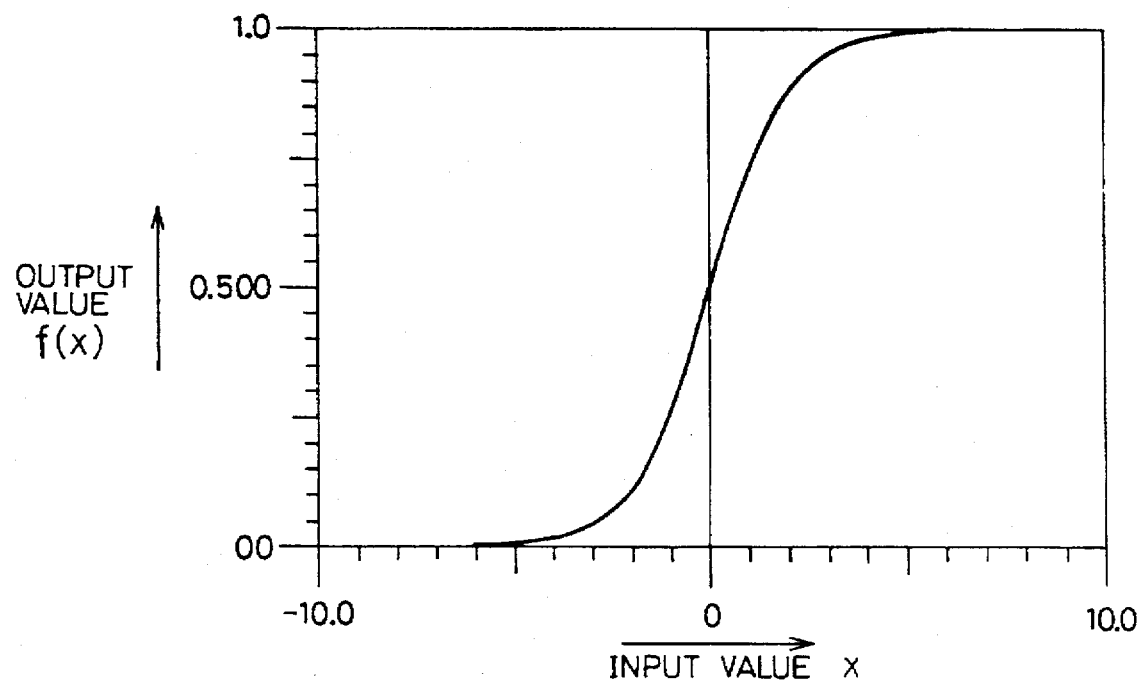
FIG. 6 is a graph explaining a sigmoid function.

As shown in FIG. 5, the weight $Wg_{ij}$ represents a slope, dG/dz, of the membership function G=f(z) when the input value z is the center value (i.e., 0.5). Further, as shown in FIG. 6, the sigmoid function referred herein is a non-linear function whose input value x is in a range between −∞ and +∞ and whose output value f(x) is in a range 0.0<f(x)<1.0, expressed by Equation (6) below.

$$f(x) = \frac{1}{1+\exp(-x)} \tag{6}$$

Within the Middle area G2 where the outputs of the nodes B2 and B3 are inputted into the node C2, the AND of the two sigmoid functions must be computed. To be more specific, the computation result of the input value $x_1$ of FIG. 3 through the node B2 to the node C2 and the computation result of the input value $x_1$ from the node B3 to the node C2 are compared, and whichever smaller is selected as the output value from the node C2 corresponding to the Middle area G2. Likewise, the computation result of the input value $x_2$ from the node B6 to the node C5 and the computation result of the input value $x_2$ from the node B7 to the node C5 are compared, and whichever smaller is outputted.

The rule layer D includes nine nodes D1–D9 to correspond to any possible link of the node C1–C3 and C4–C6 in the membership layer C which correspond to the three areas G1–G3 for the input values $x_1$ and $x_2$, respectively. To be more specific, the nodes C1, C2, and C3 are connected to the nodes D1–D3; D4–D6; D7–D9 by links J11–J13; J21–J23; J31–J33, respectively. On the other hand, the nodes C4, C5, C6 are connected to the nodes D1, D4, D7; D2, D5, D8; D3, D6, D9 by links J41–J43; J51–J53; J61–J63, respectively. Note that a weight of one is given to each of the links J11–J13; J21–J23; J31–J33; J41–J43; J51–J53; J61–J63.

Thus, two inputs are given to each of the nodes D1–D9. Each of the nodes D1–D9 selects the smaller of the two inputs $M_{ik}$ and $M_{rk}$ as expressed by Equation (7) below, whereby $R_p$ (p=1, 2, . . . , 9) is outputted.

$$R_p = \min\{M_{ik}, M_{rk}\} \tag{7}$$

The output value $R_p$ of each of the nodes D1–D9 in the rule layer D is sent to a node F1 in the output layer F through links Q1–Q9 having their respective weights of $Wf_1$–$Wf_9$ which are determined in advance using the knowledge obtained from experts in the related field. Thus, a weighted mean of the output values $R_p$ from the nodes D1–D9 is computed in accordance with the weights $Wf_1$–$Wf_9$ of the links Q1–Q9 to allocate the heater on-time, which is expressed as Equation (8) below:

$$f(x) = \frac{\Sigma R_p \times Wf_p}{\Sigma R_p} \quad (8)$$

Here, f(x) is the output value y, namely, the on-time $t_{on}$.

Figure 7:
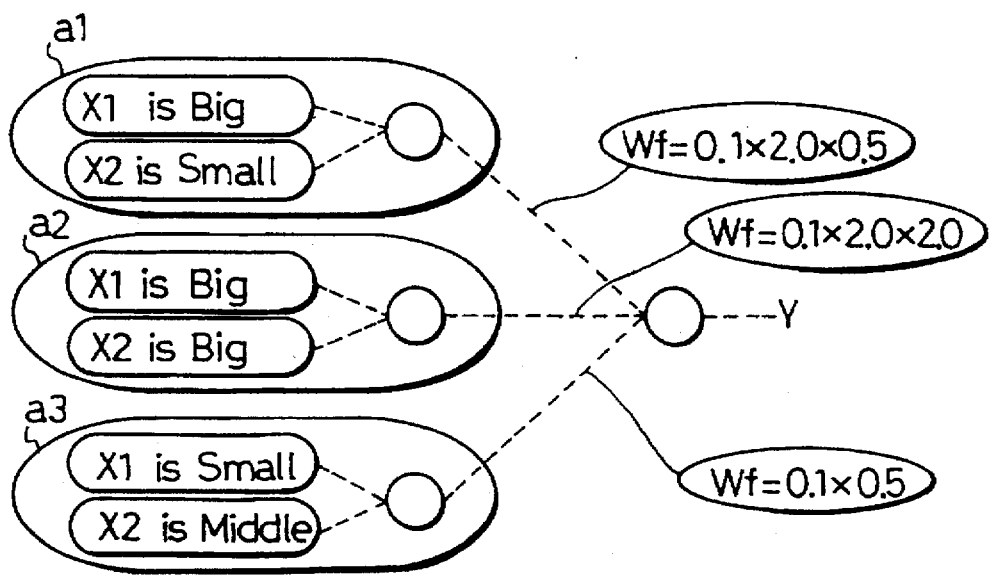
FIG. 7 is a view explaining a method of determining of the weight of each rule of a network.

Next, how each weight is determined will be explained with reference to FIG. 7. To begin with, a rule 11 is generated using the knowledge obtained from experts. Herein, rule 11 comprises "x is Big then y is Big.", "$x_2$ is Small then y is Small", and "$x_1$ is Big and $x_2$ is Big then y is Big." Next, AND rules a1–a3 are generated in the rule layer, and an initial value of a weight is determined by comparing links between the nodes of the expert rule 11 and those of the AND rules a1–a3 in the rule layer.

The initial value of each rule is set to a reference value, for example, 0.1. Next, a weight of a link to the output layer from an AND rule is multiplied with the number of input values of the network if the AND rule fits a rule in the rule 11 of experts that an output value y increases. In contrast, a weight of a link to the output layer from an AND rule is multiplied with the inverse number of the input values of the network if the AND rule fits a rule in the rule 11 of experts that an output value y decreases.

For example, since the input value $x_1$ is Big in the AND rule a1, an output value y is made Big under the rule 11. Thus, this fits a rule in the rule 11 that an output value y increases, and therefore, the initial value of the weight, 0.1, is multiplied with the number of input values of the network, two. Further, since the input value $x_2$ is Small, an output y is made Small under the rule 11. Thus, this fits a rule in the rule 11 that an output value y decreases, and therefore, the initial value of the weight, 0.1, is multiplied with the inverse of the number of the input values of the network, 0.5. Accordingly, the initial value of the weight of the AND rule a1 is determined as 0.1×2×0.5=0.1. Similarly, the weight of the AND rule a2 is determined as 0.1×2×2=0.4, and the weight of the AND rule a3 is determined as 0.1×0.5=0.05. The values thus obtained are the initial values of the weights of these rules a1–a3 before the learning, respectively.

In the initial stage of the network assembly, each weight is determined in advance using the knowledge obtained from the experts as explained in the above. However, these weights may not be appropriate for the input values $x_1$ and $x_2$ in some cases. Therefore, the fuzzy neural network 31 of the present invention adjusts the weights at real time using the knowledge obtained from the learning while controlling the heater 15. The learning algorithm based on the back propagation used in the present invention is common in the neural network.

Upon receipt of the control signal from the surface temperature comparing unit 22, the heater on-time computing unit 20 sends the surface temperature T and temperature change rate ΔT used for the computation to the predictive surface temperature computing unit 21. Then, the predictive surface temperature computing unit 21 inversely computes a predictive heater on-time by adding the surface temperature T and temperature change rate ΔT, and sets the result of the computation in the heater on-time computing unit 20 as an output target value (hereinafter, teacher data Ot). The heater on-time computing unit 20 also substitutes the surface temperature T and temperature change rate ΔT into the fuzzy neural network 31 as the input values $x_1$ and $x_2$, respectively, and finds the output value y.

Then, an error function E, which is a square error of the output value y and teacher data Ot thus found, is found using Equation (9) below. The learning is performed by fine-adjusting the weights $Wc_{ij}$, $Wg_{ij}$, and $Wf_p$ to minimize the error function E.

$$E = \frac{1}{2}(Ot - y)^2 \quad (9)$$

The weights are fine-adjusted by (1) finding influence of each of the weights $Wc_{ij}$, $Wg_{ij}$, and $Wf_p$ by partial differentiation of the error function E with the weights $Wc_{ij}$, $Wg_{ij}$, and $Wf_p$, and (2) changing each weight slightly in a direction such that reduces the error function E. In other words, the error function E is partial differentiated by the output value y, which is expressed by Equation (10) below, and the influence of the output value y on the error function E is found.

$$\frac{\partial E}{\partial y} = -(Ot - y) \quad (10)$$

Equation (10) reveals that the output value y influences the error function E more in the positive direction when the output value y is greater than the teacher data Ot. Thus, to minimize the error function E, the output value y must be adjusted in a direction such that reduces the influence of the output value y, that is, in the negative direction. Likewise, when the output value y influences the error function E more in the negative direction, the output value y is fine-adjusted in the opposite direction, that is, in the positive direction. In other words, the value of the error function E can be decreased by (1) finding the influence of each of the weights $Wc_{ij}$, $Wg_{ij}$, and $Wf_p$ on the error function E, and (2) fine-adjusting each weight in a direction opposite to the influence.

More specifically, the influence of the weight $Wf_p$ on the error function E is found using Equation (11) below, and the weight $Wf_p$ is corrected in a direction such that reduces the influence using Equation (12) below.

$$\frac{\partial E}{\partial Wf_p} = \frac{\partial E}{\partial y} \cdot \frac{\partial y}{\partial Wf_p} = -(Ot - y)\frac{R_p}{\Sigma R_p} \quad (11)$$

$$\Delta Wf_p = -\alpha \frac{\partial E}{\partial Wf_p} \quad (12)$$

where α is a learning parameter used to adjust a degree in fine-adjusting the weight $Wf_p$.

Next, the influence of the weight $Wg_{ij}$ on the error function E is found using Equation (13) below, and the weight $Wf_{ij}$ is corrected in a direction such that reduces the influence using Equation (14) below.

$$\frac{\partial E}{\partial Wg_{ij}} = \frac{\partial E}{\partial y} \cdot \frac{\partial y}{\partial R_p} \cdot \frac{\partial y}{\partial M_{ik}} \cdot \frac{\partial M_{ik}}{\partial Wg_{ij}} \quad (13)$$

$$= -(Ot - y)\sum_m \left[\frac{Wf_p - y}{\Sigma R_p}\right] M_{ik}(1 - M_{ik})H_{ij}$$

$$\Delta Wg_{ij} = -\beta \frac{\partial E}{\partial Wg_{ij}} \quad (14)$$

where β, like the parameter α, is a learning parameter used to fine-adjust the weight $Wf_{ij}$.

Further, the influence of the weight $Wc_{ij}$ on the error function E is found using Equation (15) below, and the weight $Wc_{ij}$ is corrected in a direction such that reduces the influence using Equation (16) below.

$$\frac{\partial E}{\partial Wc_{ij}} = \frac{\partial E}{\partial y} \cdot \frac{\partial y}{\partial R_p} \cdot \frac{\partial y}{\partial M_{ik}} \cdot \frac{\partial M_{ik}}{\partial H_{ij}} \cdot \frac{\partial H_{ij}}{\partial Wc_{ij}} \quad (15)$$

$$= -(Ot - y)\sum_m \left[\frac{Wf_p - y}{\Sigma R_p}\right] M_{ik}(1 - M_{ik})Wg_{ij}$$

-continued $$\Delta Wc_{ij} = -\gamma \frac{\partial E}{\partial Wc_{ij}} \quad (16)$$

where γ is a learning parameter used to fine-change the weight $Wc_{ij}$. Note that the learning parameters α, β, and γ are determined in advance based on the experiments to prevent an excessive weight correction. In other words, the learning parameters α, β, and γ are set to specific values such that minimizes the error function E when they are changed. For example, the relation among these parameters may be $\alpha \geq \beta \geq \gamma$. Finally, the weights $Wf_p$, $Wg_{ij}$, and $Wc_{ij}$ are corrected using Equations (17)–(19) with unit correcting values found using Equations (12), (14), and (16), namely, $\Delta Wf_p$, $\Delta Wg_{ij}$, and $\Delta Wc_{ij}$, respectively.

$$Wf_p(lt+1) = Wf_p(lt) + \Delta Wf_p \quad (17)$$

$$Wg_{ij}(lt+1) = Wg_{ij}(lt) + \Delta Wg_{ij} \quad (18)$$

$$Wc_{ij}(lt+1) = Wc_{ij}(lt) + \Delta Wc_{ij} \quad (19)$$

where lt represents the number of times of learning. For example, Equation (17) indicates that the current value $Wf_p(lt)$ is corrected using the unit correcting value $\Delta Wf_p$, and the result of which, $Wf_p(lt+1)$, is outputted as the following value.

After the weights $Wc_{ij}$, $Wg_{ij}$, and $Wf_p$ are fine-adjusted in the above manner, the input values $x_1$ and $x_2$ are given again to find the error function E with the teacher data Ot. The learning ends when the error function E becomes in a predetermined range, for example, not more than ±2° C., or when the number of times of learning lt reaches a predetermined value, for example, 100.

Note that the number of times of learning is in such a range that can be performed repetitively within a blink of time, for example, one second, so that the learning time can be reduced. Since the control of the heater 15 is suspended during the learning period, the shorter the learning period, the faster the control of the heater 15. However, the manufactures has already completed the learning using the standard experimental data and a value of the error function E is quite small in practice. Moreover, since the network only has to learn one piece of data, there will be no trouble if the number of times of learning is small. During the learning period, the temperature of the heat fusing roller 14 changes due to remaining heat or releasing heat. Therefore, when the learning period ends, the surface temperature T(n) and temperature change rate $\Delta T_{on}(n-1)$ at that time are computed again, so that the fuzzy neural network 31 that has just finished the learning computes the output value y.

Figure 8:
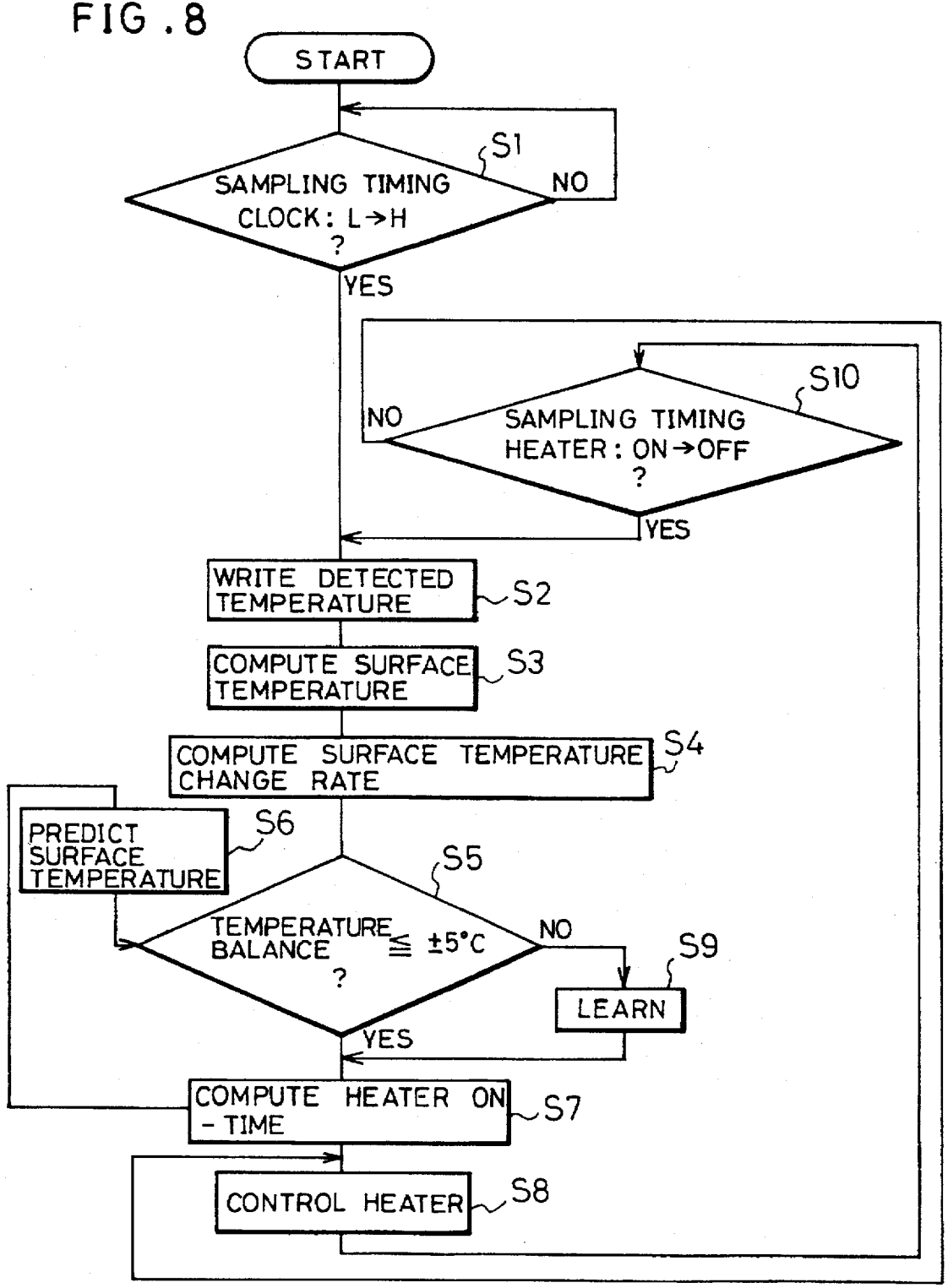
FIG. 8 is a flowchart detailing a control operation of an on-action of a heater.
Figure 9:
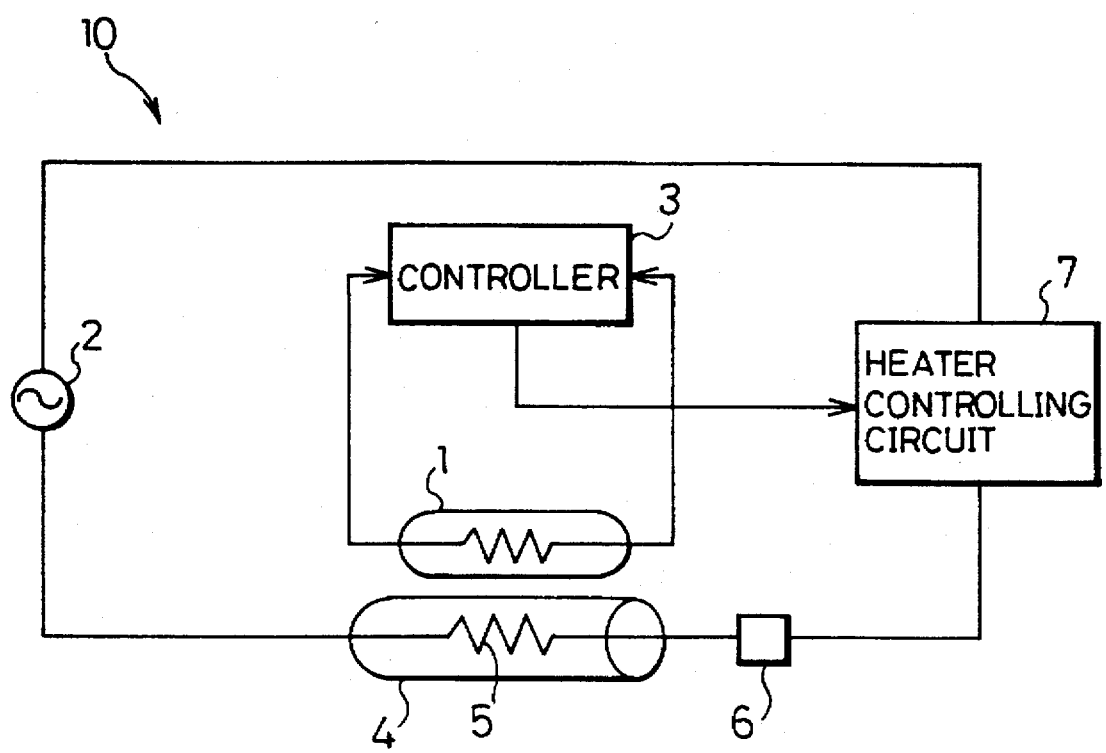
FIG. 9 is a block diagram depicting a typical electrical structure of a conventional heat fusing device.

FIG. 8 shows a flowchart explaining the control method of the heater 15. In Step 1, whether the sampling timing of the time period t(h) has come or not is checked. Step 1 is repeated until the sampling timing comes, and when it comes, the flow proceeds to Step 2. In Step 2, the output voltage value of the temperature detecting unit 11 is converted into the digital form from the analogue form and written into the surface temperature computing unit 18. In Step 3, the surface temperature computing unit 18 finds the surface temperature corresponding to the voltage value with reference to the above-mentioned voltage-temperature conversion table. In Step 4, the surface-temperature change rate computing unit 19 computes the temperature change rate using the surface temperature found in Step 3.

In Step 5, the surface temperature comparing unit 22 compares the balance between the actual surface temperature found in Step 3 and the predictive surface temperature found in Step 6 which is explained below, with a predetermined value, for example, ±5° C. If the temperature balance is less than ±5°, the heater on-time computing unit 20 computes the heater on-time in Step 7, and controls the turning-on action of the heater 15 by means of the heater control circuit 17 in Step 8. When the heater on-time is computed in Step 7, then in step 6, the predictive surface temperature computing unit 21 predicts the surface temperature to be used in Step 5.

On the other hand, if the temperature balance is greater than ±5°, the surface temperature unit 22 outputs the control signal to the heater on-time computing unit 20 in Step 9, and the learning are performed using the learning parameters α, β, and γ. Subsequently, the heater on-time is computed in Step 7, and the turning-on action of the heater 15 is controlled in Step 8. In Step 10, whether the computed on-time has passed or not is checked. If it has not, the flow returns to Step 8 to keep the heater 15 turned on; otherwise, the heater 15 is turned off and the surface temperature is sampled. That is to say, when such a sampling timing comes, the flow returns to Step 2, and the surface temperature $T_{on}(n-1)$ at the on timing in FIG. 2 is found.

As has been explained, the heat fusing device 30 in accordance with the present invention finds the on-time of the heater 15 using the fuzzy neural network 31, and the weights of the links of the fuzzy neural network 31 are corrected through the sequential learning. Thus, the on-time of the heater 15 is corrected to an optimal one such that does not cause an overshoot. As a result, the fuzzy rule can be generated in a simpler manner. Moreover, since the weight on each rule is changed whenever necessary, the fuzzy rule can be changed flexibly for individual heat fusing devices 30 depending on the models, aged distortion, or environments thereof.

The input parameters of the fuzzy neural network 31 are the surface temperature of the heat fusing roller 14 and the temperature change rate thereof. Thus, only the surface temperature of the heat releasing means has to be detected as the parameter. This reduces the number of parameter detecting sensors, and hence reducing the manufacturing costs and simplifying the structure of the heater controlling unit. Moreover, since only two input parameters are used for the computation, the computation time can be reduced, thereby making it possible to respond to the temperature change in a more prompt manner.

Each of the input layer A and membership layers B and C of the fuzzy neural network 31 has a structure that divides an input value into three areas G1, G2, and, G3 of a fuzzy set, while the rule layer D is assembled with ANDs of all the possible linking rules among the areas G1, G2, and G3 for each of the input values $x_1$ and $x_2$. Accordingly, the areas can be controlled individually and a control in response to a complicated change can be realized. If an input link that does not fit the fuzzy rule obtained from the knowledge of experts, such a link can always find a matching link by changing the weight. Thus, the weight adjustment followed by the sequential learning enables an optimal on-time control, even if the weight is not set to a specific value.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A heater controlling unit for controlling an on/off action of a heater to control a surface temperature of heat releasing means which releases heat generated by said heater through conduction, said heater controlling unit comprising:

temperature detecting means for detecting an actual temperature of a surface of said heat releasing means;

temperature change rate computing means for computing a temperature change rate within a predetermined period using the actual temperature detected by said temperature detecting means; and on-time computing and control means including a fuzzy neural network, said fuzzy neural network receiving the actual temperature detected by said temperature detecting means and the temperature change rate computed by said temperature change rate computing means and computing a period of time during which said heater is turned on using a fuzzy logic to output a computed value, said on-time computing and control means controlling said on/off action based on the output computed value from said fuzzy neural network, said fuzzy neural network including a plurality of layers each having a node for outputting an output signal in response to an input signal, and a plurality of links that interlink the node of said each layer to transmit a signal among layers, a weight of said each link, which indicates signal transmission efficiency among the nodes, being adjusted based on a difference between a target value and the output computed value from said fuzzy neural network.

2. The heater controlling unit as defined in claim 1 further comprising:

predictive computing means for, when said heater is turned on by said on-time computing and control means, computing a predictive temperature of the surface of said heat releasing means for a next time said heater is turned on, said predictive temperature being computed using the actual temperature detected by said temperature detecting means and the temperature change rate computed by said temperature-change rate computing means; and comparing and adjusting means for computing a difference between the actual temperature and the predictive temperature, and, when said difference is greater than a predetermined value, said comparing and adjusting means adjusting the weight of said each link within said fuzzy neural network in such a manner to minimize a difference between said target value and said period of time during which said heater is turned on computed by said on-time computing and control means.

3. The heater controlling unit as defined in claim 2, wherein said fuzzy neural network comprises an input layer, a membership input layer, a membership output layer, a rule layer, and an output layer, each of links among said layers having their respective weights.

4. The heater controlling unit as defined in claim 3, wherein:

each of said input layer and said membership input layer has a structure that divides each of the actual temperature and the temperature change rate into three areas; and said rule layer outputs ANDs of all possible links of an output value from a node corresponding to each area of the actual temperature and an output of a node corresponding to each area of the temperature change rate in said membership layer to said output layer.

5. The heater controlling unit as defined in claim 3, wherein said comparing and adjusting means adjusts a weight of a link from said input layer to said membership input layer, a weight of a link from said membership input layer to said membership output layer, and a weight of a link from said rule layer to said output layer.

6. The heater controlling unit as defined in claim 5, wherein said input layer includes a first node for receiving the actual temperature, a second node for receiving the temperature change rate, and a third node for receiving a fixed value, a weight of a link from said third node to said membership input layer being a center value of a membership function, a weight of a link from said membership input layer to said membership output layer being a slope of the membership function.

7. The heater controlling unit as defined in claim 2, wherein:

said temperature change rate computing means computes a first temperature change rate in a period during which said heater is turned on, and a second temperature change rate in a period during which said heater is turned off; and said predictive computing means computes the predictive temperature by adding up (1) a current actual temperature, (2) a product of a preceding first temperature change rate and a following period during which said heater is turned on, and (3) a product of a preceding second temperature change rate and a following period during which said heater is turned off.

8. The heater controlling unit as defined in claim 1, wherein said fuzzy neural network includes:

a rule layer having a plurality of nodes each for processing a signal based on their respective fuzzy rules; and an output layer having a node for outputting said period of time during which said heater is turned on, the node of said output layer being connected to an output side of said each node of said rule layer.

9. The heater controlling unit as defined in claim 8, wherein said fuzzy neural network further includes:

an input layer into which the actual temperature and the temperature change rate are inputted; and a membership input layer and a membership output layer, provided between said input layer and rule layer, for converting the actual temperature and the temperature change rate into a fuzzy variable using a membership function.

10. The heater controlling unit as defined in claim 1 further comprising:

predictive computing means for, when said heater is turned on by said on-time computing and control means, computing a predictive temperature of the surface of said heat releasing means for a next time said heater is turned on, said predictive temperature being computed using the actual temperature means and the temperature change rate computed by said temperature-change rate computing means; and comparing and adjusting means for computing a difference between the actual temperature detected by said temperature detecting means and the predictive temperature computed by said predictive computing means, and, when the difference is greater than a predetermined value, for adjusting a weight of a link within said fuzzy neural network of said on-time computing and controlling means to minimize the difference.

* * * * *